United States Patent [19]
Norwood

[11] 3,876,545
[45] Apr. 8, 1975

[54] FILTER CHANGING DEVICE FOR EXTRUSION MACHINES

[75] Inventor: David W. Norwood, Baltimore, Md.

[73] Assignee: Concorde Fibers, Inc., Columbia, Md.

[22] Filed: Sept. 1, 1972

[21] Appl. No.: 285,706

[52] U.S. Cl. .......... 210/236; 210/DIG. 15; 210/447
[51] Int. Cl. ............................................. B01d 29/00
[58] Field of Search .......... 210/232, 446, 447, 448, 210/451, 497.1, 510, 236

[56] References Cited
UNITED STATES PATENTS

| | | | |
|---|---|---|---|
| 586,724 | 7/1897 | Edmonds | 210/447 |
| 1,335,899 | 4/1920 | Hahlenberg | 210/446 |
| 3,225,929 | 12/1965 | Sicard | 210/232 |
| 3,240,342 | 3/1966 | Callahan, Jr. et al. | 210/232 |
| 3,295,684 | 1/1967 | Webb | 210/446 X |
| 3,397,794 | 8/1968 | Toth et al. | 210/446 X |
| 3,645,401 | 2/1972 | Roberts | 210/232 |
| 3,797,665 | 3/1974 | Paquette | 210/447 |

FOREIGN PATENTS OR APPLICATIONS
565,285  7/1960  France ............................ 210/446

Primary Examiner—Theodore A. Granger
Attorney, Agent, or Firm—Nolte and Nolte

[57] ABSTRACT

A filter changing device for an extrusion machine comprises a cylindrical body member having a central bore for receiving thermoplastic material from an extruder, and a sleeve member slidably mounted on the body member. The sleeve member has an inwardly extending flange on the end, so that a filter holder may be held between the inwardly extending flange and the end of said body member. The end of the body member is formed as a sliding guide for the filter screen holder. The sleeve member has slots aligned with the filter holder to permit insertion and removal of the filter holder. Longitudinally extending slots in the sleeve member are aligned with keys on the body member to inhibit relative rotation of the sleeve member and body member.

11 Claims, 5 Drawing Figures

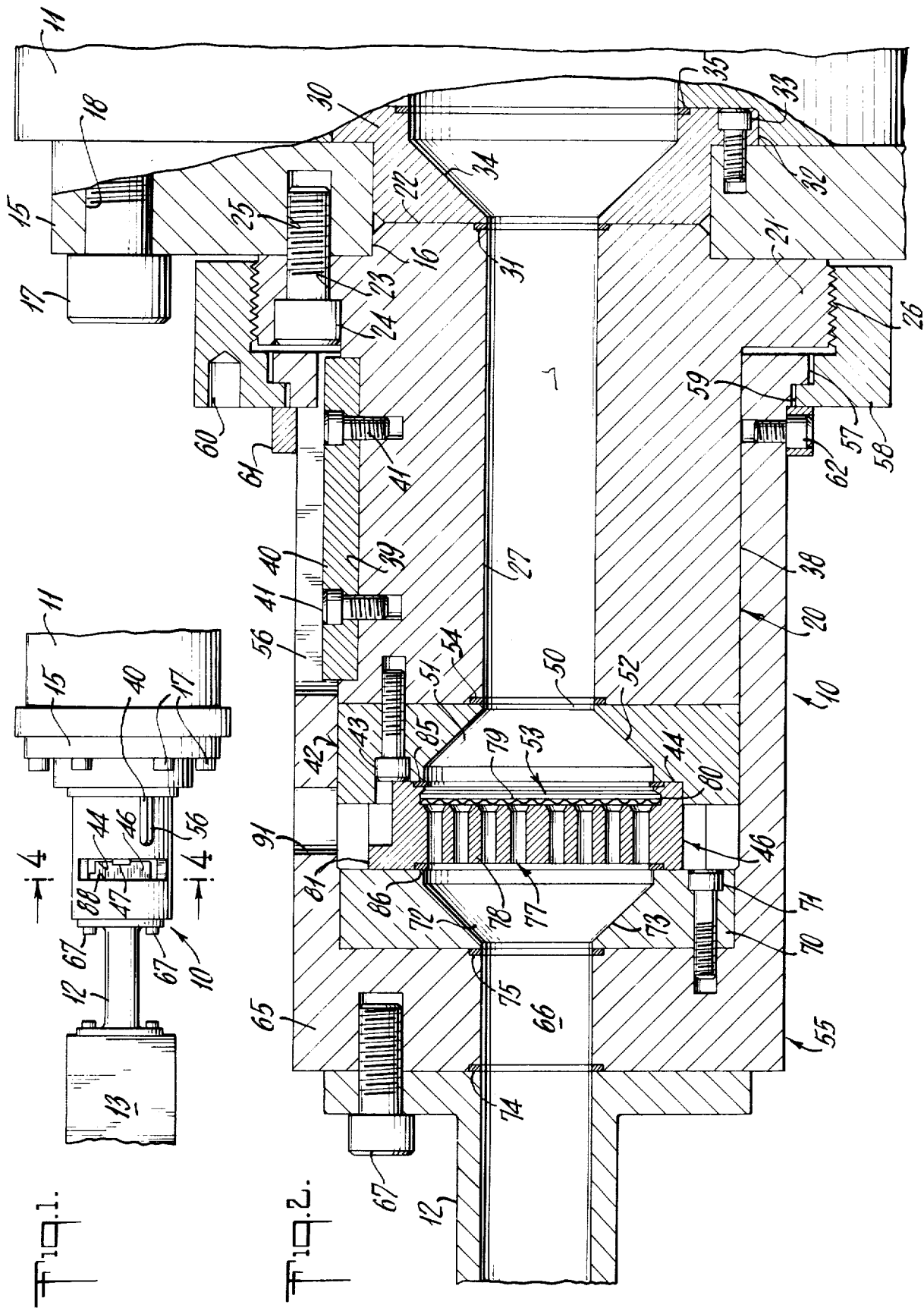

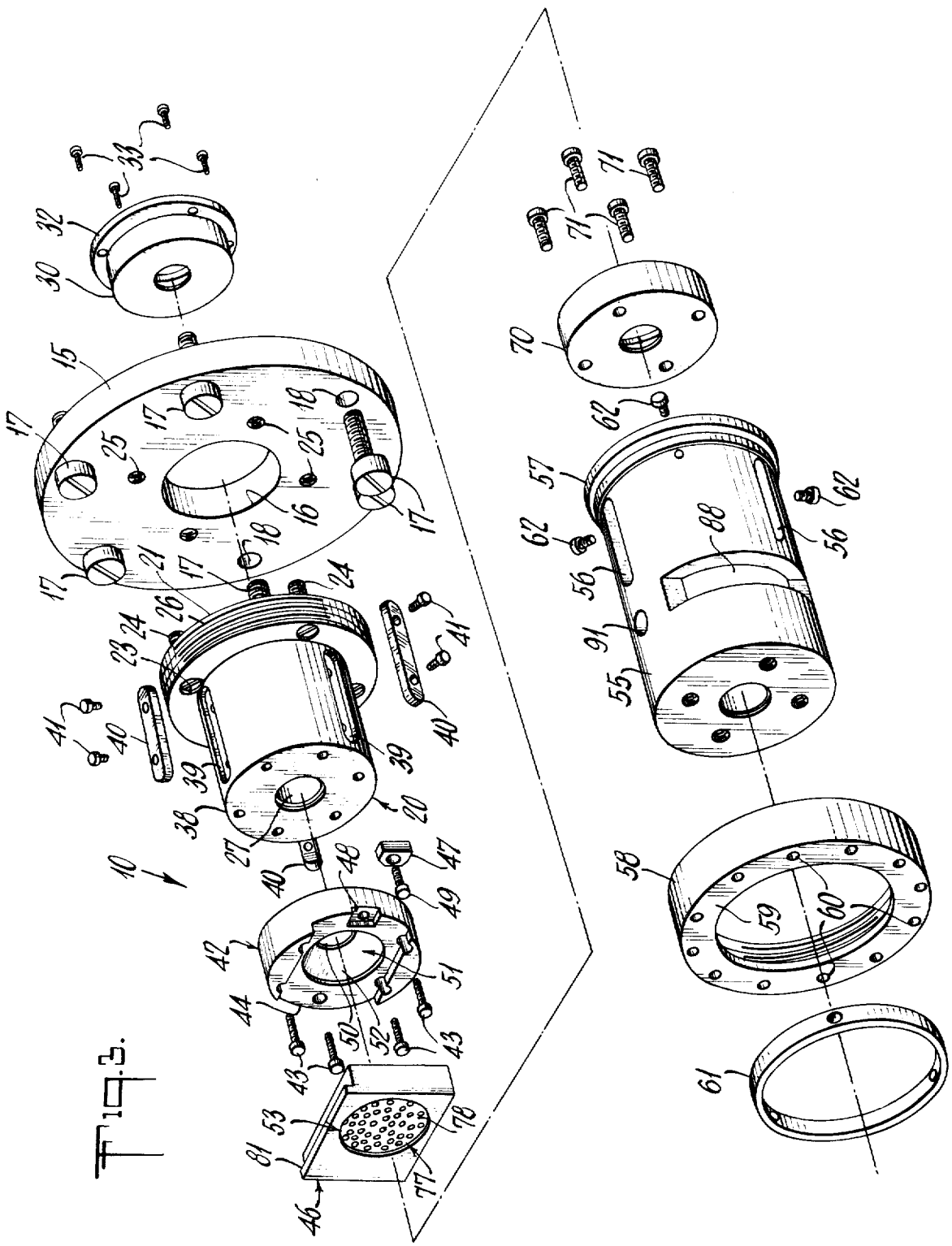

FILTER CHANGING DEVICE FOR EXTRUSION MACHINES

This invention relates to filter changing devices, and more in particular to filter changing devices of the type employed to filter thermoplastic material employed in extrusion processes.

Extruding machines are employed in the fabrication of thermoplastic materials to form shaped products, such as filaments, foils and the like. In the use of such machines, solid thermoplastic material is generally feed in particulate form, such as in the form of pellets, to the extruder, the material being heated and compressed in the extruding machine to form a melt. The melt is directed to flow from the extruder to a die assembly, in order to shape the material to the desired form. In order to inhibit the passage of solid particles in the melt of a size larger than a predetermined rather small size, a filter screen assembly is generally mounted between the extruding machine and the die assembly. Filters of this type are generally comprised of a foraminous plate positioned to support one or more layers of metallic screen, the screen having a mesh size to inhibit the passage of undesired solid material. In order to insure smooth operation of the apparatus, it is generally necessary to change or clean the filter screen at relatively frequent intervals.

In the past, many filter changing devices have been provided for permitting changing and cleaning of filters in extrusion systems. In one type of device, it is necessary that the extruder be shut down during the time that the filter screen is changed. Devices of this type have frequently been so complex as to require a considerable shutdown period, which is very undesirable. In order to overcome this problem, filter screen devices have also been devised to enable the changing of filters without shutting down the extruder. Although this is a very desirable feature, it has been found that economically feasible devices of this type are in general subject to leaking.

According to the present invention, a easily and readily fabricated filter changing device is provided, which is simple to operate, and which requires a minimum shutdown time of the extruder. In addition, the filter changing device according to the invention is reliable, and has been found not to be subject to leaking.

In accordance with the invention, a filter changing device is comprised of a cylindrical body member having a central axial passageway. The body member is adapted to be mounted on an extruder for receiving thermoplastic material. For this purpose, a flange may be provided at one end of the cylindrical body member, and if necessary an adapter ring may be provided to adapt the diameter of the passageway to the exit port of the extruder.

A sleeve member is provided, having one end surrounding the body member and adapted to be slid therealong. The other end of the sleeve has inwardly extending flange means having a central aperture aligned with the passageway, this aperture forming the exit port of the device. A stationary seat is provided on the other end of the body member, and a seat is also provided on the inside of the flange of the sleeve member, the seats being adapted to engage opposite sides of a transversely slidable filter screen holder. For this purpose, the stationary seat is provided with a transversely extending recess, for guiding the filter screen holder, and slots are provided in the sleeve to permit insertion and withdrawal of a filter screen holder in the recess.

In order to clamp the seats on opposite sides of the filter screen holder, the end of the sleeve member is provided with an outwardly extending flange, and the end of the body member is provided with an outwardly extending flange having external threads. A clamping ring engages the flange of the sleeve member and is threaded onto the threads of the flange on the body member, thereby urging the seat within the sleeve member toward and into engagement with the filter screen holder. In order to prevent relative rotation of the sleeve member and the body member, the body member may be provided with longitudinally extending keys on its outer cylindrical surface, the sleeve member having longitudinally extending slots which engage the keys.

Further in accordance with the invention, stop means may be provided in the recess in order to permit ready alignment of the filter screen holder, and a projection may be provided on the filter screen holder in order to prevent insertion thereof in the wrong direction.

In order that the invention will be more clearly understood, it will now be described in greater detail with reference to the accompanying drawings, in which:

FIG. 1 is a fragmentary side elevation of a filter changing device according to the invention, illustrated in operative position between an extruder and a die;

FIG. 2 is an enlarged longitudinal cross-sectional view of the device of FIG. 1;

FIG. 3 is an exploded view of the device according to the invention;

Figure 4:
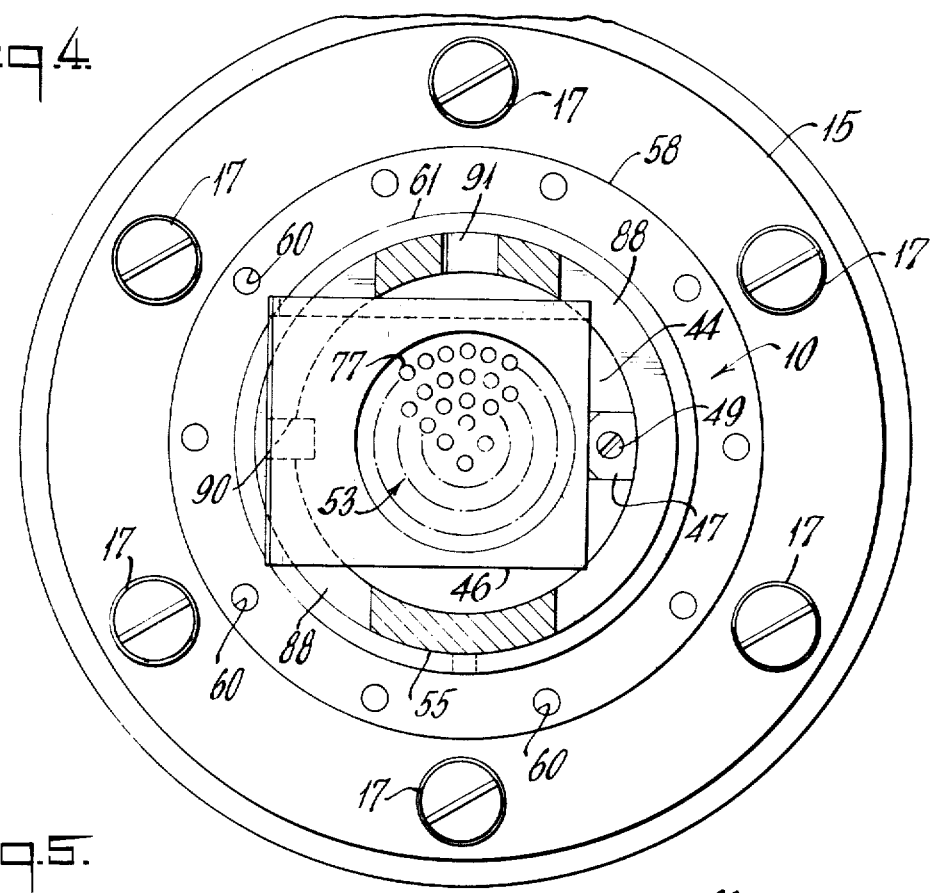
FIG. 4 is an enlarged transverse cross-sectional view of the arrangement of FIG. 1 taken along the lines 4—4.

Referring now to the drawings, and more in particular to FIG. 1, a screen shifter assembly 10 according to the invention is illustrated connected between the discharge end of an extruder 11 and a conduit 12, the outlet end of the conduit 12 being connected to an extrusion die assembly 13. In this type of arrangement, molten thermoplastic material is discharged from the extruder 11 by way of the filter assembly 10 and conduit 12 to the die assembly 13, the filter assembly 10 serving to strain any solid particles larger than a predetermined size from the melt before it reaches the die assembly.

A filter assembly according to one embodiment of the invention is more clearly illustrated in the longitudinal cross-sectional view of FIG. 2 and the exploded view of FIG. 3. Referring now to these figures, one end of the screen assembly is comprised of a flat annular flange member 15 having a central aperture 16. The flange 15 is adapted to be bolted to the extruder 11, for example by means of screws 17 extending through holes 18 spaced about the periphery of the flange.

An inner cylindrical body member 20 is provided with a flange 21 spaced from one end 22 thereof, the flange 21 having circumferentially spaced bolt holes 23 through which screws 24 extend, the screws 24 extending into threaded bolt holes 25 in the flange 15, so that the body member 20 is mounted coaxially on the flange 15. The flange 21 is provided with external threads 26. The end 22 of the body member 20 has an outer diameter substantially equal to the diameter of the aperture 16, and extends partially through the aperture 16. In addition, the body member 20 has a central bore 27 for the passage of molten thermoplastic from the extruder.

If necessary, in order to adapt the filter assembly according to the invention to the extruder, if the bore 27 has a diameter differing from the exit port of the extruder, an adapter ring 30 may be provided extending into the other side of the aperture 16. The end of the adapter 30 abuts the end 22 of the body 20, and a suitable sealing ring 31 may be provided at this point. The adapter ring 30 also has an outwardly extending flange 32 to permit the bolting of member memeber to the side of the flange 15 opposite to the side to which the body member 20 is bolted, for example by means of screws 33. The interior surface 34 of the adapter ring is shaped to provide a transition between the diameter of the exit port of the extruder and the diameter of the bore 27, and a suitable sealing ring 35 may be provided between the adapter ring 30 and the extruder 11.

The outer cylindrical surface 38 of the body member 20 extending from the other side of the flange 21 is provided with a plurality of longitudinally extending key slots 39 adapted to receive keys 40 which are held in place by suitable means such as screws 41.

An annular stationary seat 42 is affixed to the end of the body member 20, and coaxial therewith, for example by means of screws 43. The seat 42 has a diameter substantially equal to the diameter of the surface 38 of the body member 20, and the surface of the seat 42 abutting the body member 20 is flat. The opposed surface of the seat 42 has a transversely extending recess 44, the heads of the screws being recessed so that the recess 44 is free. The recess 44 is adapted to receive a screen holder 46 which, as will be described in later paragraphs, is slid into position in the recess 44 from a side of the device, and in order to position the screen holder 46 in correct position in the recess 44 a stop member 47 is held in a recess 48 at one side of the recess 44, for example by means of screw 49, to inhibit sliding of the screen holder beyond a determined position. The entrance port 50 of the stationary seat 42 has a diameter substantially equal to the diameter of the bore 27, and is aligned therewith, and the aperture 51 through the seat 42 may have an outwardly extending transition zone 52 to adapt the device to the diameter of the screen assembly 53 in the screen holder 46. A suitable seal 54 is provided between the body member 20 and the stationary seat 42. While the seat 42 may be formed as a unitary member with the body member 20, it is preferable that it be formed separately in order to simplify its fabrication.

A cylindrical sleeve 55 is provided surrounding the cylindrical portion 38 of the body member 20, and adapted to be axially slidable with respect to the body member 20. The inner diameter of the sleeve 55 is thus selected so that the sleeve 55 can readily and easily be slid on the surface 38. The sleeve 55 is provided with longitudinally extending slots 56 positioned such that the keys 40 slide in the slots 56 to prevent relative rotation between the sleeve 55 and body member 20. The end of the sleeve 55 adapted to be received by the inner body member 20 is provided with an outwardly extending flange 57, and a clamping ring 58 is provided surrounding the flange 57 and having internal threads so that the clamping ring 58 may be threaded on the threads 26 of the flange 21. The clamping ring 58 has an inwardly extending flange 59 engaging the flange 57 of the sleeve, so that the clamping ring 58 firmly holds the sleeve 55 from axial movement when the clamping ring 58 is threaded on the flange 21. The exposed side of the clamping ring 58 may be provided with circumferentially spaced holes 60, to permit this ring to be rotated by a spanner wrench of conventional nature. A retaining ring 61 may be screwed onto the outer surface of the sleeve 55, for example by means of screws 62, to inhibit relative axial movement between the clamping ring 58 and the sleeve 55, so that unthreading of the clamping ring by rotational movement thereof effects the axial withdrawal of the sleeve 55 from the inner body member 20. As indicated more clearly in FIG. 2, the slots 56 in the sleeve 55 may extend under the flange 57, to permit the total removal of the sleeve from the inner body member.

The other end of the sleeve 55 has an inwardly extending flange 65 with a central bore 66 of diameter substantially equal to the diameter of the bore 27, so that the conduit 12 may be bolted thereto, for example by means of screws 67.

An annular front seat member 70 is held within the sleeve 55 against the inner surface of the flange 65, for example by means of screws 71. The front seat 70 has a central aperture 72 with an entrance port substantially equal in diameter to that of exit port of stationary seat 42, and a transition zone 73 extending radially inwardly so that the exit port of the front seat 70 is of substantially the same diameter as the aperture 66 of the flange 65. Suitable seals 74 and 75 are provided between the flange 65 and the conduit 12 and front seat 70 respectively.

The screen holder 46, as above noted, is generally rectangular in cross-section so that it may be transversely slid in the recess 44 of the stationary seat 42. The holder 46 has a central aperture for receiving a filter 77 of conventional nature. For example, the filter 77 may be comprised of a foraminous plate 78 on the exit side thereof, and one or more metallic screens 79 received in an annular recess 80 in the entrance side thereof. In order to prevent reversal of the screen holder in the stationary seat during assembly, the rear of the screen holder may be provided with a projection, such as the upwardly extending projection 81, so that the screen holder may be inserted in the stationary seat only if the projection 81 is toward the exit side of the device. Annular seals 85 and 86 are provided in recesses in the entrance and exit sides of the screen holder. These seals are preferably of a material such as aluminum, having a nominal thickness slightly greater than the depth of their respective recesses. It has been found that these seals, being of a soft material, provide a leakproof seal for the screen holder.

Figure 5:
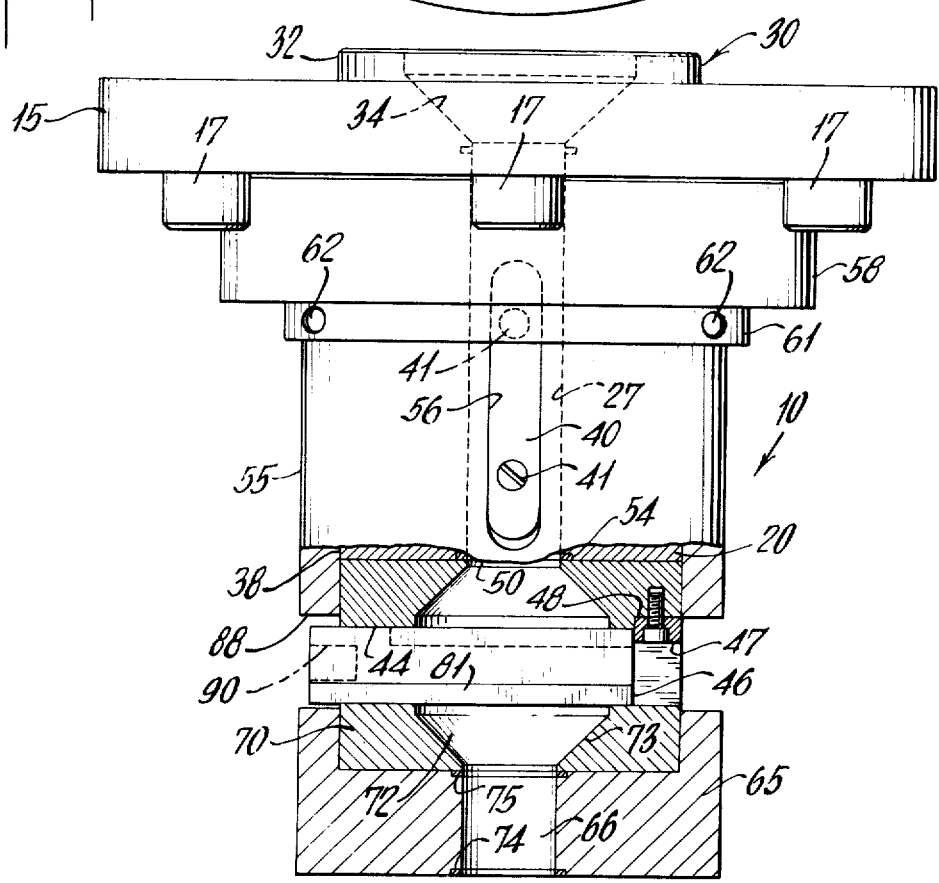
FIG. 5 is a top view, partially in cross-section, of a portion of the inner components of the arrangement of FIG. 2.

Referring now to FIGS. 4 and 5, a milled slot 88 is provided in each side of the sleeve 55. These slots are of suitable dimension that the screen holder may be passed therethrough, thereby permitting the insertion and removal of the screen holder in the stationary seat. Since the screen holder is generally rectangular, the corners thereof will project into the milled slots 88 when the screen holder is in position. The stop block 48 inhibits movement of the screen holder in one direction, as above noted, so that the screen holder may be properly placed by sliding it into the recess 44, by way of a slot 88, until the screen holder abuts against the stop 48. In order to facilitate insertion and removal of the screen holder, one end thereof may be provided with a threaded hole 90 to permit insertion of a threaded tool (not shown) therein, so that the screen holder may be readily pulled out of or pushed into position. An inspection hole 91 may be provided extending through the wall of the sleeve 55 normal to the axis of the device in the region of the screen holder.

In normal operation, thermoplastic material from the extruder 11 passes through the filter arrangement 10, by way of the central aperture therein and the filter, and thence outwardly through the conduit 12 to the die assembly 13. When it is desired to clean the filter, or insert a new filter, the extruder is temporarily shut down, and the clamping ring is rotated, for example by means of a spanner wrench, to remove axial pressure from the screen holder. The screen holder may then removed, for example by means of a tool threaded into the aperture 90, and a new or cleaned screen is returned into position in the device, as illustrated for example in FIG. 4, following which the clamping ring is again tightened. When the clamping ring is tightened, the front seat 70 is forced against the exit side of the screen holder, to effect a leakproof seal between the screen holder and the stationary and front seats, by means of the annular sealing rings 85 and 86 respectively. The extruder may then be turned on again.

The above disclosed arrangement according to the invention is characterized by its simplicity of construction, and the fact that changing of the filter assembly is quickly and readily accomplished, with a minimum of down time for the extruder. The arrangement is reliable, and is not subject to leaking of the thermoplastic materials around the seals. In addition, the device has been constructed so that it may be readily cleaned. The components of the device may be fabricated from conventional materials, such as steel and steel alloys, although it is preferable that seals 85 and 86 at the screen holder be of a softer material such as aluminum.

While the invention has been disclosed with reference to a single embodiment, it will be apparent that many modifications and variations may be made therein without departing from the invention, and it is therefore intended in the following claims to cover all such modifications and variations as fall within the true spirit and scope of the invention.

I claim:

1. A filter screen changing device comprising a cylindrical body member having a central axial passageway whereby the passageway at one end of said body member forms an entrance port for receiving a material to be filtered, a sleeve member slidably mounted on said body member and having an inwardly projecting flange means at one end thereof with a central aperture aligned with said passageway, said aperture forming an exit port for said device, a seat on the other end of said body member including guide means, a screen holder slidably positioned in said guide means for movement in a transverse direction, releasable clamping means for urging said flange means toward said other end of said body member for rigidly holding said screen holder between said seat and said flange means, means inhibiting relative rotation of said body member and sleeve member, and slot means in said sleeve member positioned in transverse alignment with said screen holder whereby said screen holder may be passed through said slot means into said guide means.

2. A filter screen changing device comprising a cylindrical body member having a central axial passageway, the passageway at one end of said body member forming an entrance port for said device, a sleeve member having one end axially slidably mounted on said body member, the other end of said sleeve member having inwardly extending flange means with a central aperture, whereby said aperture forms an exit port for said device, an annular seat surrounding said aperture on the inside of said sleeve member, seat means on the other end of said body member, said seat means having a central aperture aligned with said passageway, and a transversely extending recess, filter screen holder means mounted in said recess, releasable clamping means on said sleeve member for urging said annular seat toward said seat means for holding said screen holder means therebetween, slot means in said sleeve member transversely aligned with said screen holder means for inserting and withdrawing said holder means therethrough, and means for inhibiting relative rotation of said sleeve member and said body member.

3. The filter screen changing device of claim 2 wherein said releasable clamping means comprises an outwardly extending first flange at said one end of said body member, said first flange having external threads, an outwardly extending flange on said one end of said sleeve member, a clamping ring having an internally extending flange engaging said second flange and internal threads engaging said external threads, and retaining ring means on said sleeve member for inhibiting relative axial movement between said clamping ring means and said sleeve member.

4. The filter screen changing device of claim 2 wherein said means inhibiting relative rotation comprises longitudinally extending key members on the external cylindrical surface of said body member, and longitudinally extending slots in said sleeve member and positioned to engage said key means.

5. The filter screen changing device of claim 2 wherein said recess in said seat means extends transversely of said device and has a pair of parallel spaced apart guide surfaces on opposite sides of the aperture, said screen holder means having a generally rectangular cross-section in a plane transverse of said device, whereby a pair of opposite edges of said holder means are slidably guidable by said guide surfaces.

6. The filter screen changing device of claim 5 wherein said holder means has a central aperture aligned with said passageway, and filter screen means positioned in said central aperture therein.

7. The filter screen changing device of claim 5 wherein the thickness of said holder means in the longitudinal direction of said device is greater than the depth of said recess, and one of the edges of said holder means has a projection positioned to inhibit placement of said holder means in said recess except when a determined face of said holder means is directed toward said seat means.

8. The filter screen changing device of claim 5 wherein said holder means has a central aperture for receiving filter screen means, and a recess at each end of said aperture of said holder means, and further comprising an aluminum sealing ring in each of said recesses of said holder means, said sealing rings having dimensions in the longitudinal direction of said device greater than the depth of said recesses.

9. The filter screen changing device of claim 5 wherein the central aperture of said seat means has an outwardly extending transition zone toward said holder means, and said annular seat has an inwardly extending transition zone toward the central aperture of said inwardly extending flange means of said sleeve member.

10. The filter screen changing device of claim 5 further comprising stop means in said recess for inhibiting movement of said holder means in said recess beyond a determined position in one direction.

11. The filter screen changing device of claim 2 further comprising a flat annular flange affixed to and co-axially aligned with said one end of said body member for forming a mounting flange, and an adapter ring mounted in the aperture of said flange and aligned with said passageway, said adapter ring having an inwardly extending transition toward said passageway.

* * * * *